United States Patent
Fliegel

(10) Patent No.: US 6,574,188 B1
(45) Date of Patent: Jun. 3, 2003

(54) SELF-ADHESIVE SPINDLE-SHAPED BUTTON DISK AND THE USE THEREOF

(75) Inventor: Erwin Fliegel, Alling (DE)

(73) Assignee: Phonosound Musikproduktions GmbH, Alling (DE)

( * ) Notice: Subject to any disclaimer, the term of this patent is extended or adjusted under 35 U.S.C. 154(b) by 0 days.

(21) Appl. No.: 09/623,820

(22) PCT Filed: Mar. 10, 1999

(86) PCT No.: PCT/DE99/00653

§ 371 (c)(1),
(2), (4) Date: Nov. 17, 2000

(87) PCT Pub. No.: WO99/46773

PCT Pub. Date: Sep. 16, 1999

(30) Foreign Application Priority Data

Mar. 10, 1998 (DE) .......................................... 198 10 303
Mar. 13, 1998 (DE) .......................................... 198 10 966

(51) Int. Cl.⁷ .............................. G11B 3/70; G11B 5/84; G11B 7/26
(52) U.S. Cl. .................................................. 369/289
(58) Field of Search ............................... 369/289, 292, 369/272, 273, 290; 360/135, 137

(56) References Cited

U.S. PATENT DOCUMENTS

| 3,039,218 A | * | 6/1962 | Whiting et al. ............. 283/117 |
| 5,332,089 A | | 7/1994 | Tillett et al. ................ 206/310 |
| 5,533,614 A | | 7/1996 | Walker .................... 206/308.1 |
| 5,685,424 A | | 11/1997 | Rozek et al. ............. 206/308.1 |
| 5,725,934 A | * | 3/1998 | Gallant ....................... 369/282 |
| 5,799,982 A | * | 9/1998 | McClure et al. ............. 283/72 |
| 5,857,575 A | | 1/1999 | Watson et al. ................ 211/4 |
| 6,013,352 A | * | 1/2000 | Gallant ....................... 369/282 |
| 2002/0057530 A1 | * | 5/2002 | Lalouette .................... 360/135 |

FOREIGN PATENT DOCUMENTS

| EP | 0503171 A1 | * | 9/1992 |
| WO | 95 27286 | | 10/1995 |

* cited by examiner

Primary Examiner—William Klimowicz
Assistant Examiner—Julie Anne Watko
(74) Attorney, Agent, or Firm—Collard & Roe, P.C.

(57) ABSTRACT

The invention relates to a self-adhesive spindle-shaped button disk (1) and to the use thereof enabling disk-shaped information carriers to be secured in a detachable manner. The inventive disk is easy to produce and astonishingly simply to use. In is simplest embodiment it consists of two layers. One layer (13) is an adhesive layer and the other layer (12) causes a compact disk (6) to be clamped with a center hole (7). The spindle-shaped button disk (1) has a plurality of applications and can be used in particular to secure compact disks in a detachable manner on a relatively flat surface.

11 Claims, 7 Drawing Sheets

SELF-ADHESIVE SPINDLE-SHAPED BUTTON DISK AND THE USE THEREOF

BACKGROUND OF THE INVENTION

The present invention relates to a self-adhesive button disk and to the use thereof, said button disk serving the purpose of securing disk-shaped information carriers on a suitable surface in a detachable manner, in particular so-called compact disks (CD's) on vertical surfaces.

Self-adhesive disk-shaped devices that are to be glued or secured on a plane surface are well-known in the prior art. The known devices for attachment to a flat surface in order to secure with such devices any desired types of object on a wall are generally constructed in such a way that they can be attached only to surfaces having a certain type of surface structure. Such a surface either has to be smooth, so that a suction cup generates a defined vacuum by which the device is retained. Another known possibility for securing certain objects in a detachable manner are offered in the form of the so-called velcro closures, in conjunction with which a very defined surface needs to be available as well in order to offer support for the device.

It is perceived as a drawback of the known devices for securing any type of desired object in a detachable manner that the actual holding device, on which the objects are fastened, require relatively much expenditure, and that such holding devices can be employed only in a predetermined position in which they can be used, such as, for example, on vertical surfaces.

Not known are devices for securing disk-shaped information carriers in a detachable way that can be secured with adhesive on any desired type of surface, and which are not depending on a defined direction of use.

SUMMARY OF THE INVENTION

Therefore, the problem of the present invention is to make available a device by which disk-shaped information carriers can be secured in an effortless way on a surface in a detachable manner, whereby the device as defined by the invention is favorable in terms of cost, and, furthermore, it can be manufactured in a simple way.

Said problem is solved according to the invention with the features of the independent main claims.

The invention consists of a self-adhesive button disk for detachably securing disk-shaped information carriers on flat surfaces, preferably compact disks (CD's) with a center breakthrough. The invention is characterized by a flat part whose diameter (D1) of the circle enclosing the corners of the part has a predetermined size. The self-adhesive button disk is primarily to be used for securing compact disks with a handle in a detachable manner on any desired surface without paying too much attention to the fastening process.

The self-adhesive button disk advantageously has a part whose form is any desired polygonal train, whereby a quadrangle or a circle is to be preferably selected.

Furthermore, it is advantageous to produce the button disk as defined by the invention from at least two layers, whereof one layer is an adhesive layer and the other layer consists of a yielding material. In this connection, the adhesive layer can be distributed in a continuous or discontinuous way on the surface intended for it. If an adhesive is employed for the adhesive layer, it is also advantageous if an adhesive is used that will not leave any traces of adhesive on the suitable surface after the button disk has been detached from it.

The second layer is formed in an advantageous manner from a so-called moss rubber, which is relatively soft on the one hand, and develops a clamping effect on the center breakthrough of the disk-shaped information carrier on the other.

Another advantageous embodiment of the second layer can be seen in the fact that said layer is produced from cardboard, and that the adhesive layer is directly joined with the cardboard. It is important for the present invention in any case that the second layer consists of yielding material. The yielding material can be advantageously realized by assembling lamella-like plastic components in the form of a circle, so that such components are elastically engaged with the center breakthrough of the compact disk. In the event that the disk-shaped information carrier is a normal compact disk, the diameter D1 amounts to D1=15 mm+0.1 to 0.3 mm, whereby the added measure is dependent on the material, i.e. the added measure is greater with soft material than with as harder material.

It is advantageous and essential to the invention that the total height (H) of the self-adhesive button disk amounts to about 1.5 to 3 mm. Because of such a flat design, the self-adhesive button disk as defined by the invention has a wide application spectrum, e.g. for packaging cases for CD's.

Such packaging cases are known in the prior art. The known packaging cases are manufactured from a foldable material such as, for example cardboard, as a rule. The layout of the packaging case has either been punched out already in this connection, or it is prepunched on any desired sheet, so that the layout of the packaging case has to be cut out and it is subsequently folded together. With such relatively simple and favorably priced packaging cases for disk-shaped information carriers, in particular for CD's, it is perceived as disadvantageous that the disk-shaped information carriers are not safely secured in the packaging case, so that they either slip out or are scratched due to minor movements.

The method for producing the packaging case as defined by the invention, which is preferably made of cardboard, for packaging disk-shaped information carriers, preferably compact disks in such a way that they cannot shift around, comprises the following steps of the method:

Configuration of the entire printed image on the video screen of a computer;

insertion of a defined pretreated sheet of a standardized size, on which the layout of the packaging case having a recess at least on one side of the packaging case has been prepunched;

imprinting of the pretreated standardized sheet with the printed image configured in the computer by means of a printer;

separation of the layout from the prepunched sheet;

folding the packaging case to be produced together; and gluing of at least one flat button disk having a defined diameter, preferably 15 mm+0.1 to 0.3 mm to the side opposing the recess in the at least one side.

It is perceived as being an important advantage of such an embodiment of an otherwise known packaging case for CD's that provision is made according to the invention for a device for fixing the disk-shaped information carrier that can be produced at favorable cost and with simple means. The device as defined by the invention for securing the position advantageously consists of a flat button disk made of a yielding material such as, for example moss rubber, with an adhesive layer being applied to one side of said button disk. Said adhesive layer basically secures the position-securing device on any smooth surface without any problems.

Furthermore, it is advantageous to make provision on at least one side of the packaging case as defined by the invention for a center recess that is disposed at about the level of the central hole of the disk-shaped information carrier. In the exemplified embodiment, the side opposing said side should not have a recess because the device securing the position is glued on with exactly said side. The position-securing device advantageously has a thickness of about 1.5 to 3 mm, so that it substantially assumes the thickness of a normal disk-shaped information carrier.

A further advantageous embodiment of the packaging case as defined by the invention has to be seen in the fact that both sides of the packaging case have a center recess, and that a loose insert or a loose sheet is placed between the two sides, said loose insert or loose sheet being provided with a position-securing device on both sides in the prescribed sites of the recesses located in the sides of the packaging case. This makes it possible to safely store two disk-shaped information carriers in a simple packaging case without having to fear that the compact disks might constantly shift back and forth or may even drop out.

Advantageously, the upper and lower edges of the packaging case are reinforced by folding over at least one side strip, whereby at least one edge is advantageously provided with a recess that permits easy removal of the disk-shaped information carrier.

According to another exemplified embodiment of the present invention, the layout of the packaging case is designed in three parts, whereby the two outer parts each have a center recess and the center part receives a position-securing device on each of its two sides, such device securing a compact disk on each side in a detachable manner.

According to another exemplified embodiment, strips are arranged in said embodiment in a crossed form, such crossed strips each being subdivided in such a way that five part sections are produced that have at least one position-securing device.

Further features essential to the invention are disclosed in the dependent claims.

The invention is now explained in greater detail in the following with the help of drawings, in which:

DETAILED DESCRIPTION

Figure 1:
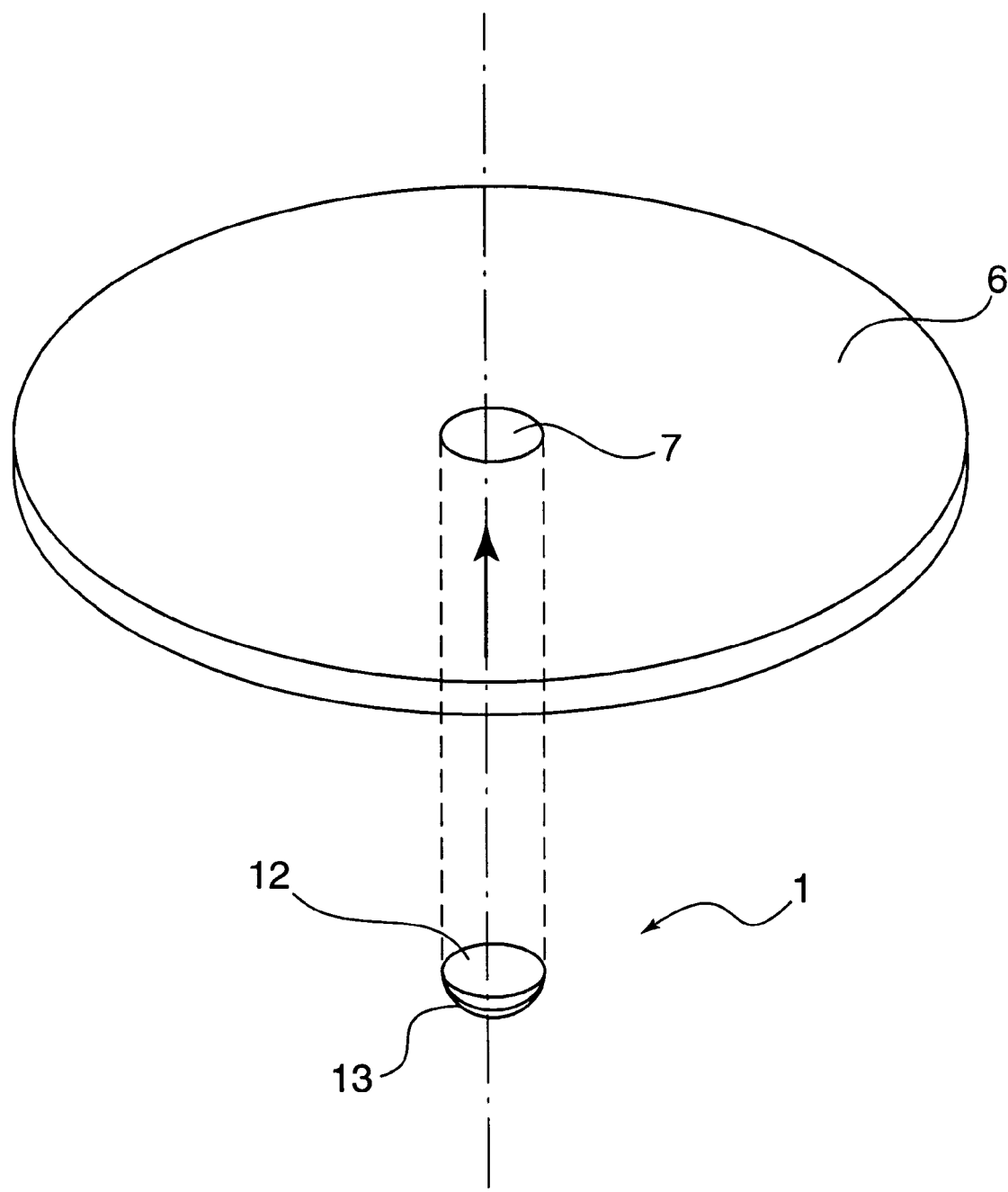
FIG. 1 is a schematic, exploded representation of the self-adhesive button disk with the component (1) as defined by the invention located below a disk-shaped information carrier (6)

FIG. 1 shows a schematic, exploded representation in which the self-adhesive button disk as defined by the invention is arranged below a disk-shaped information carrier 6. The button disk as defined by the invention consists of at least two layers, of which the one layer 12 is a yielding material developing the clamping effect, and the other layer 13 is an adhesive layer. The adhesive layer may be either a suitable adhesive or any type of a so-called velcro closure. Important is only that the adhesive layer 13 will effect adhesion when it comes into contact with a surface intended for such contact. The disk-shaped information carrier 6 is arranged above the button disk 1. Said information carrier has a center hole 7 through which the layer 12 or the component 1 is guided. The diameter of the covering circle of the layer 12 has to be selected in such a way that it is slightly larger than the diameter of the central hole 7. The measure added to the diameter amounts to about 0.1 to 0.3 mm. Therefore, a detachable fastening of the disk-shaped information carrier 6 is effected as a result of the yielding material of the layer 12.

Figure 2:
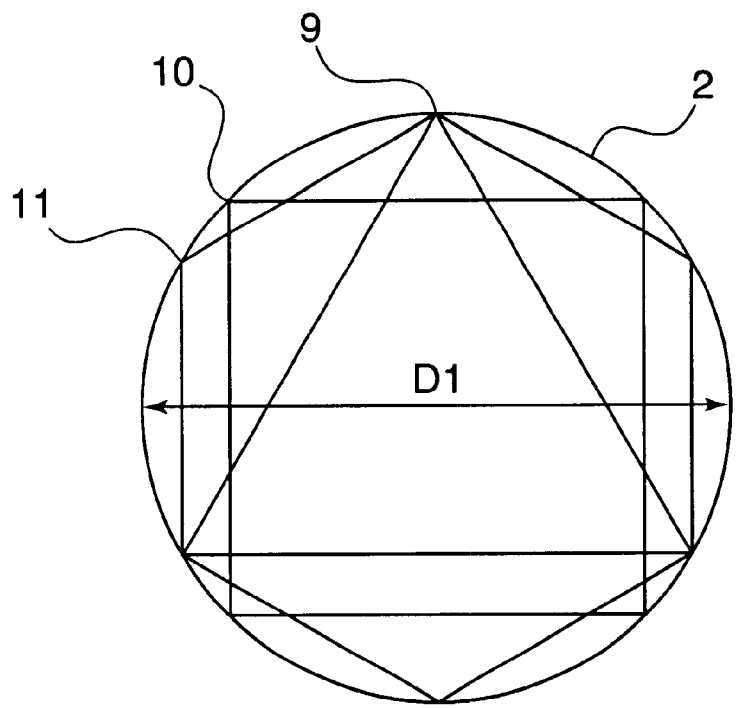
FIG. 2 is a top view of different possible components (1) as defined by the invention, with the corners (9, 10, 11) of said components being enclosed by a covering circle (2)

FIG. 2 shows the top view of different shapes of the clamping component 1 of the button disk as defined by the invention. The clamping component 1 may assume any desired polygonal shape such as, for example a triangle 9, a quadrangle 10, or a hexagon 11. The circular disk 2 represents a preferred embodiment; the diameter D1 of said circular disk corresponds with the covering circle of the corners 9, 10 and 11 of the polygons. With such polygons, the edge of the center breakthrough 7 of the compact disks 6 engages the corners 9, 10, 11 of the polygons.

Figure 3:
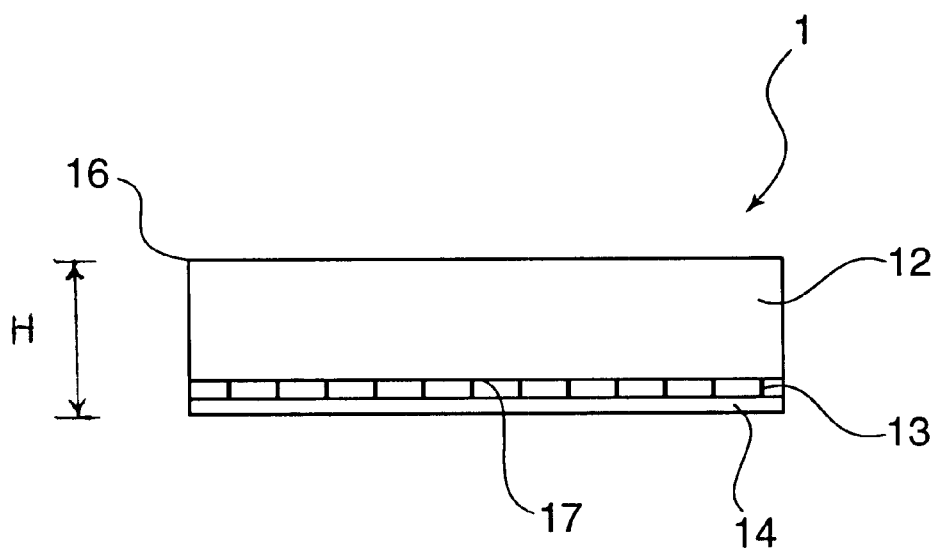
FIG. 3 is a side view of an exemplified embodiment of a self-adhesive button disk consisting of three layers (12, 13, 14)

FIG. 3 shows the side view of an exemplified embodiment of a self-adhesive flat button disk 1. This representation shows the three layers 12, 13, 14. The upper layer 12 consists of a yielding material, which advantageously is a so-called moss rubber. The surface 17 is provided for receiving an adhesive layer 13, whereby the adhesive layer 13 is distributed either continuously or discontinuously over the entire surface intended for the application of said layer. The adhesive layer itself is a suitable silicone adhesive that leaves no traces on a flat surface when the adhesive layer is removed. Another layer, which is not described here in detail, consists of the counter part of a so-called velcro closure. In the case in which the layer 13 is an adhesive, said layer is covered with a protective foil 14 so that the adhesive will not get soiled and loose its effect in that way. The corners 16 of the yielding layer 12 are slightly rounded off in order to permit superior application of the strip over the central hole 7 of the compact disk 6.

Figure 4:
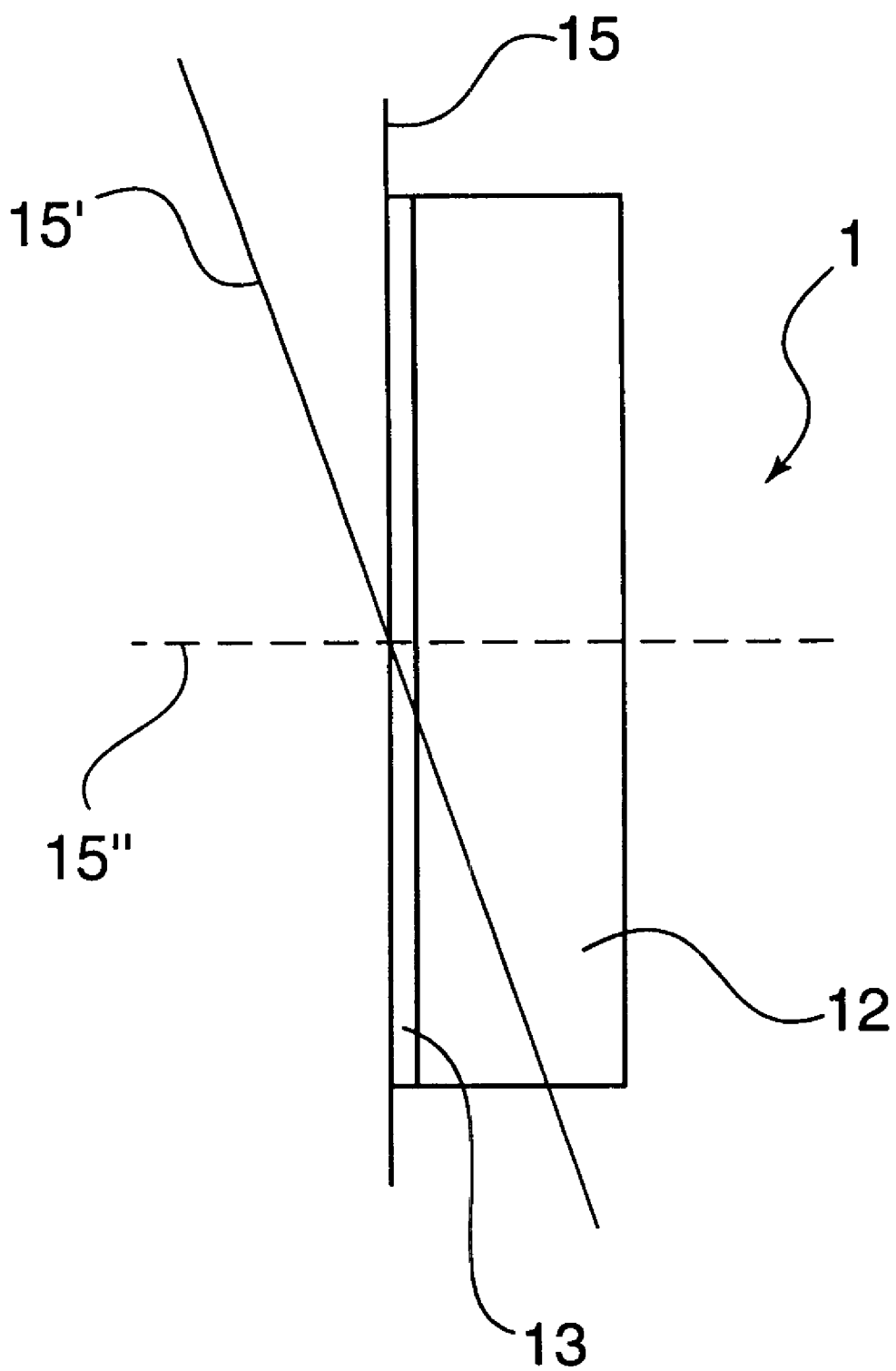
FIG. 4 is a side view of an example of application of the self-adhesive button disk as defined by the invention, on a flat surface (15)

FIG. 4 shows how the self-adhesive button disk as defined by the invention is glued to a relatively plane surface 15. It does not matter in this connection which position the surface 15 assumes. The different positions of the surface are indicated by the dashed lines 15' and 15". The vertical line has to be viewed as a preferred position of the surface 15 because it is useful and saving space, as a rule, if one or a multitude of compact disks are secured on a wall in a detachable manner.

Figure 5:
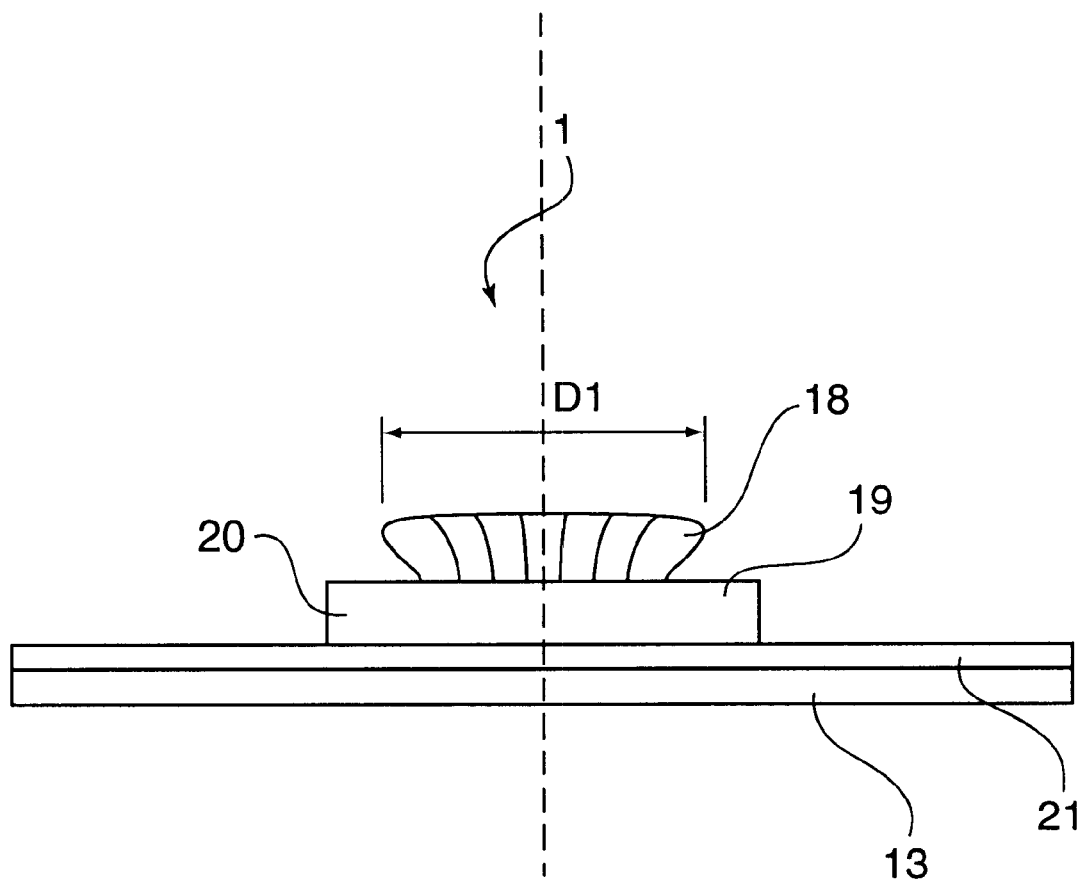
FIG. 5 is a side view of another exemplified embodiment of a button disk as defined by the invention, whose clamping layer (12) consists of lamellae (18) arranged in the form of a circle.
Figure 6:
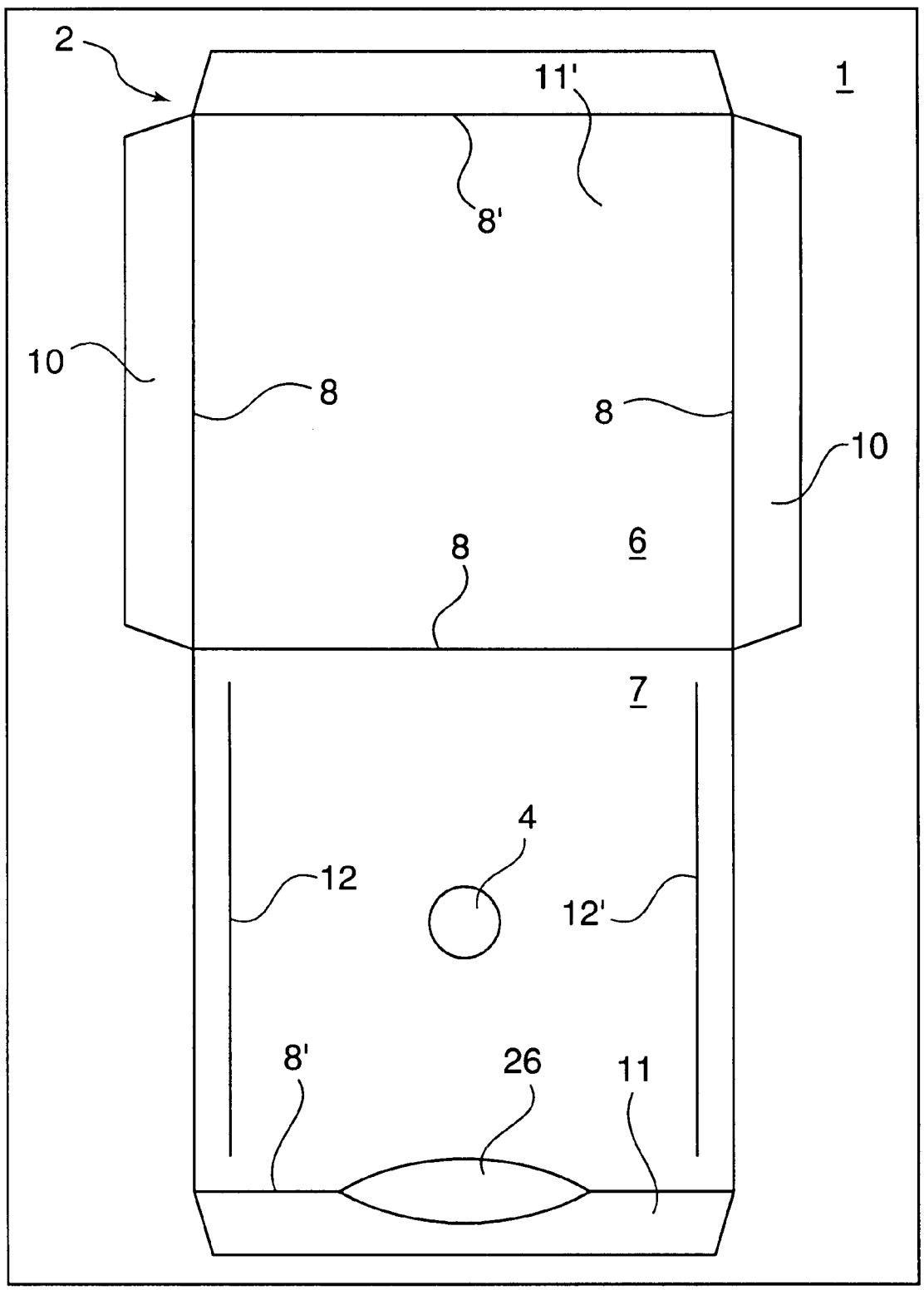
FIG. 6 shows a pretreated standardized sheet (1), in which the layout (2) of the packaging case as defined by the invention has been prepunched.

FIG. 5 shows another exemplified embodiment of the button disk as defined by the invention. A multitude of the lamellae 18 are located on a socket 19, said lamellae being arranged in the form of a circle. In the normal case of a compact disk, the diameter D1 amounts to 15 mm+0.1 to 0.3 mm. The material of the entire button disk consists of plastic. A spring effect is generated owing to the lamella-like arrangement of the components 18. The socket 19, on which the lamellae 18 are seated, can be designed in the form of several stages; however, it has at least one stage 20 that abuts the one side of the CD. The present embodiment has another flat disk 21 whose lower surface is provided with an adhesive layer 13.

FIG. 4 shows the top view of a standardized (DIN A4) sheet 1 containing a layout whose contours are prepunched by means of a micro-perforation. In the present case, the sheet 1 is multi-layered and consists of two layers, of which one layers represents the material from the packaging case is to be produced or folded. A covering foil that may contain adhesive layers on the side edges 10, 10' is located on top. A circular recess 4 is arranged in the center of the section 7; the diameter of said recess is slightly larger than the center hole of a normal compact disk. The two slots 12, 12' individual sections are folded on the folding edges 8' in a zigzag form, so that two separate pockets are formed. The two outer sections of the layout 2 each have a recess 4, 4', through the position-securing devices 9 and, respectively 9' are guided and glued to the respective sides of the center section 14 opposing one another. Further details of such a packaging case are not described here in greater detail because they are described already in detail in the preceding text.

Figure 8:
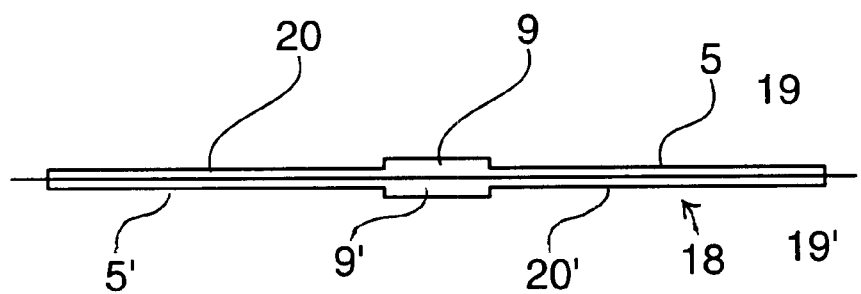
FIG. 8 is a side view of a loose insert (18) with two position-securing devices (9, 9') on both sides (19, 19') of the insert (18)

FIG. 8 shows the schematic side view of an insert 18. Viewed from the top, the insert 18 has approximately the inside dimensions of the packaging case. About in the center of the insert 18, provision is made on each of the two sides for a surface 20 and 20', respectively, to which a position-securing device 9 and 9', respectively, is glued. The predetermined surfaces 20 and 20' may be additional flat, smooth disks, to which the insert 18 is glued. In the simplest case, provision is made for only one circle for marking the surfaces 20 and 20'.

Figure 9:
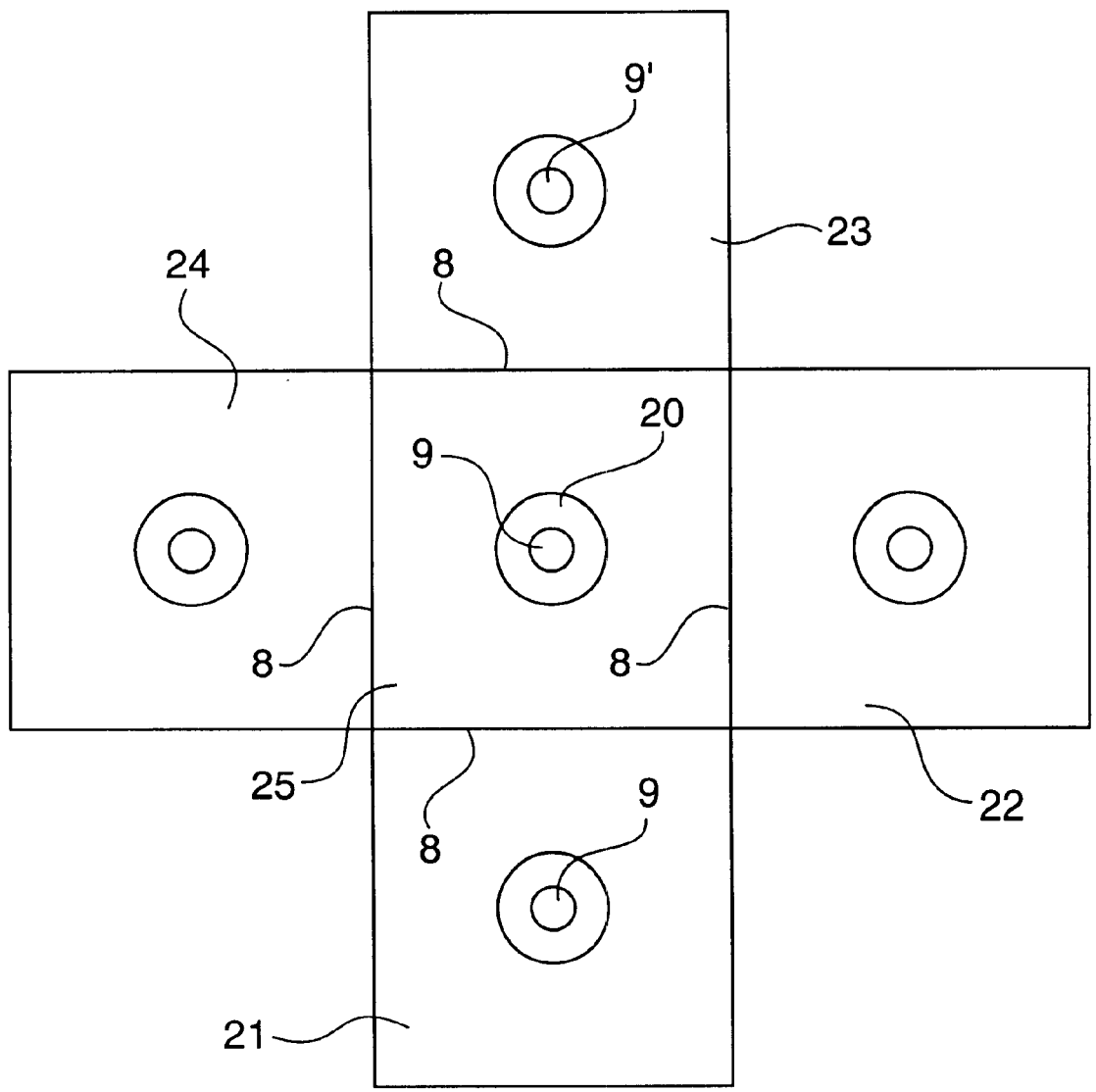
FIG. 9 shows the layout (2') of a five-component packaging case, in which each section (21, 22, 23, 24, 25) has a position-securing device (9).

FIG. 9 shows a further exemplified embodiment of a layout 2' as defined by the invention, said layout having the five sections 21 to 25. At least one position-securing device 9 can be applied to each section in about the center of each section, such position-securing devices each being engaged with a disk-shaped information carrier 5. The are laterally punched into the section 7, such slots serving the purpose of receiving the edges 10, 10' if no gluing is desired. After the layout 2 has been separated from the standardized sheet 1, it has to be folded along the folding lines 8. If the side edges 10, 10' contain an adhesive layer, the side edges are glued to the opposite side 7 of the packaging case. Thereafter, the button disk 9 has to be guided through the recess 4 in such a way that the adhesive layer of the flat button disk 9 comes into contact with the one side 6. After the flat button disk 9 has been glued to the inner side of the side 6, the compact disk to be inserted can be pushed in and the central hole of the CD can be engaged with the flat button disk. Thus the CD is provided in this way with a secured positioning that prevents the disk-shaped information carrier from sliding out of place. The upper lower edge of the packaging case is formed by a fold on the folding edges 8', whereby the side strips 11, 11' are glued to the inner surface of the side 7 and the side 6, respectively. At least one folding edge 8' is advantageously interrupted by a recess 26, which, in the present case, has an approximately oval shape.

Figure 7:
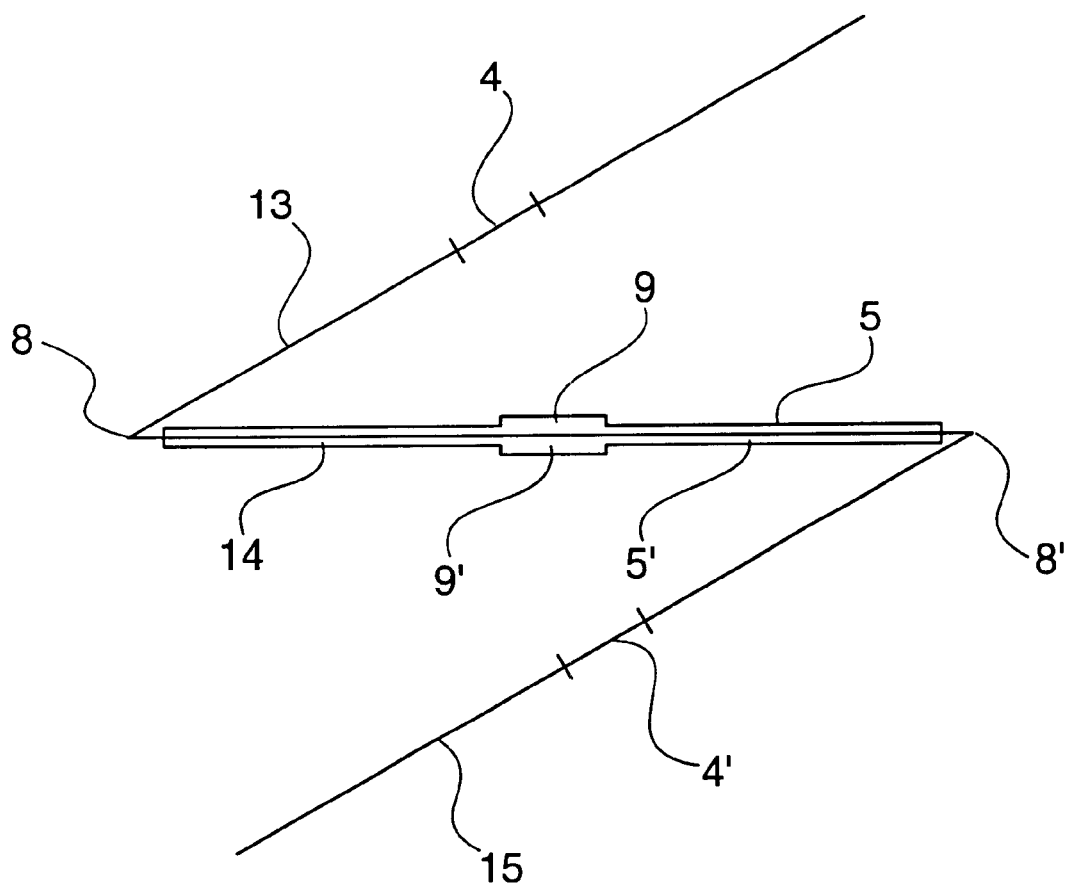
FIG. 7 is a side view of an exemplified embodiment of a packaging case with three sections (13, 154, 15) with two position-securing devices (9, 9')

FIG. 7 is a schematic side view representing a further exemplified embodiment of a packaging case as defined by the invention. In the present exemplified embodiment, the layout 2 consists of the three sections 13, 14, 15, and can receive the two disk-shaped information carriers 5 and 5'. The individual sections are created by bending each section in each case along the folding edges 8 in order to then place said edges one on top of the other. The details of the folding specifications or the way in which the layout 2' is designed is not decisive at this point. Also, it is not necessary that each of the sections 21 to 25 has a position-securing device 9. Their number is depending on the purpose of application.

The present invention primarily addresses final consumers who desire an individual imprint on the covers of their disk-shaped information carriers such as, for example compact disks. The image to be generated by a conventional printer is configured on the video screen of a conventional computer and then supplied to the printer. It is, therefore, recommended to use standardized sheets so that no new formatting is required for each cover.

What is claimed is:

1. A self-adhesive button disk comprising at least two layers, wherein:
   one of said at least two layers is comprised of a yielding material having a diameter between 15.1 mm and 15.3 mm and a height between 1.5 mm and 3.5 mm:
   another of said at least two layers is a releasable adhesive that coats one surface of said first layer; wherein
   the button disk releasably secures compact disks on plane surfaces by inserting the button disk into a central aperture of said compact disk and adhering said releasable adhesive to said plane surface; and
   said diameter of the button disk is slightly larger than a diameter of said central aperture of said compact disk and the extent said diameter of the button disk is larger than said diameter of said central aperture is dependent upon an elasticity of said yielding material.

2. The button disk according to claim 1, wherein the button disk is polygonal.

3. The button disk according to claim 1, wherein the button disk is circular.

4. The button disk according to claim 1, wherein the button disk is triangular.

5. The button disk according to claim 1, wherein the button disk is quadrangular.

6. The button disk according to claim 1, wherein the button disk is hexagonal.

7. The button disk according to claim 1, wherein the button disk has two layers.

8. The button disk according to claim 7, wherein said releasable adhesive layer is distributed continuously over said surface of said first layer.

9. The button disk according to claim 1, wherein said releasable adhesive layer is discontinuously distributed over said surface of said first layer.

10. The button disk according to claim 1, wherein said yielding material is a moss rubber.

11. The button disk according to claim 1, wherein said yielding material is cardboard.

* * * * *